Figure 1:
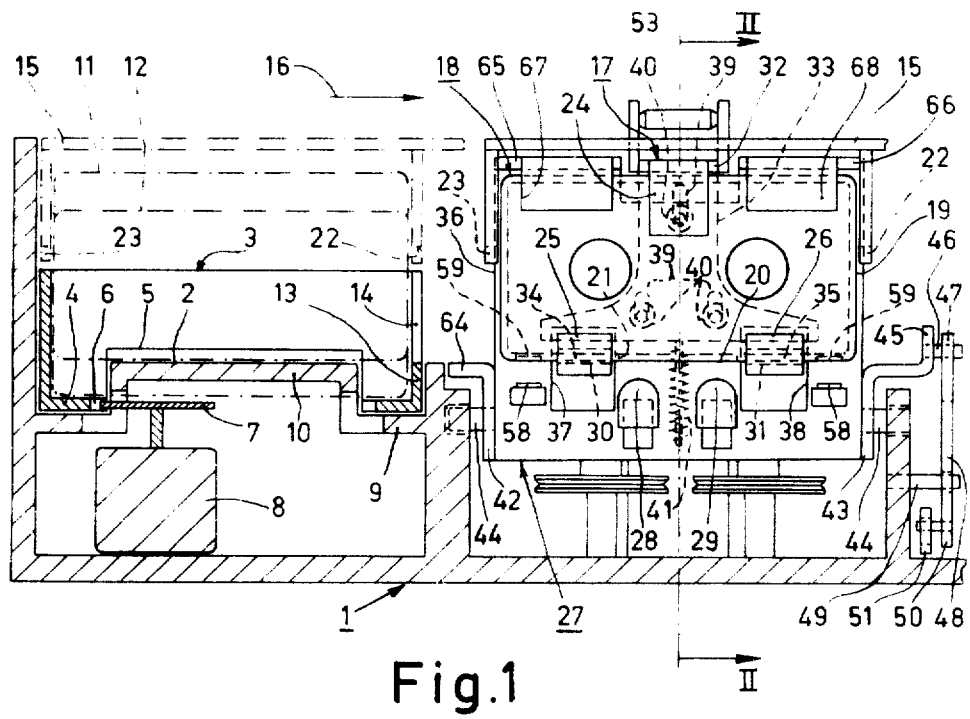

United States Patent [19]

Habelt

[11] 4,009,493
[45] Feb. 22, 1977

[54] CASSETTE RECORDING APPARATUS WITH AUTOMATIC LOADING

[75] Inventor: Gerhard Habelt, Vienna, Austria

[73] Assignee: U.S. Philips Corporation, New York, N.Y.

[22] Filed: July 14, 1975

[21] Appl. No.: 595,707

[30] Foreign Application Priority Data

July 17, 1974 Austria ............................ 5928/74

[52] U.S. Cl. ................. 360/137; 360/96; 360/105
[51] Int. Cl.² ................. G11B 23/08; G11B 19/00
[58] Field of Search ............................ 360/93–96, 360/105, 137, 132

[56] References Cited

UNITED STATES PATENTS

| | | | |
|---|---|---|---|
| 3,766,327 | 10/1973 | Johnson | 360/96 |
| 3,833,224 | 9/1974 | Haake | 360/96 |
| 3,849,799 | 11/1974 | Nakamichi | 360/96 |
| 3,870,247 | 3/1975 | Carisey | 360/96 |
| 3,913,136 | 10/1975 | Kelch | 360/96 |

Primary Examiner—Jay P. Lucas
Attorney, Agent, or Firm—Frank R. Trifari; David R. Treacy

[57] ABSTRACT

A cassette recording apparatus comprising a cassette container movable between a loading position and an operating position. The container is movably disposed on a movable support, by which the cassette container can be moved between the loading position and the operation position. At least one scanning element for the record carrier is mounted on the support, outside the cassette container when it is in the loading position. During the movement of the container from the loading position to the operating position, control elements move a cassette inserted in the container into operative engagement with the scanning element before the operating position is reached.

7 Claims, 3 Drawing Figures

CASSETTE RECORDING APPARATUS WITH AUTOMATIC LOADING

The invention relates to a recording and/or playback apparatus for record carriers in the form of tapes, which are accommodated in cassettes, thereinafter also referred to simply as cassette recording apparatus, which apparatus comprises a cassette container which is movable between a loading position and an operating position, into which a cassette can be inserted from a feed-in position with a first side, one of the narrow sides, first when the cassette container is in the loading position, a second or further narrow side of the cassette, which adjoins the first side and in which further side at least one location or opening is formed for the passage of, and operative scanning by, at least one scanning element for the record carrier, extending in the direction of insertion. Such an apparatus is for example described in German Patent Application No. 2,131,639, which has been laid open for public inspection or U.S. Pat. No. 3,833,224 corresponding thereto. As appears from the above, the cassette container of such an apparatus with a cassette inserted therein must be brought into an operating position, and scanning elements must be brought into engagement with the record carrier in the cassette, which scanning elements must be passed through an opening in the cassette. Generally, two movements are required to achieve this, namely positioning the cassette and moving the scanning elements towards the cassette. It is of particular importance that these operations are performed exactly sequentially, because a perfect cooperation of the scanning elements with the record carrier should be guaranteed under all conditions. The constructions known for performing said operations are therefore comparatively complex and expensive in view of the required reliability of operation.

It is an object of the invention to provide a very simple and reliable solution for the above-mentioned problem. To this end, a cassette recording apparatus according to the invention is characterizied in that a support for the cassette container is provided, by means of which support said container can be moved between the loading position and the operating position and on which support the container is movable in a direction perpendicular to said further narrow side of a cassette to be inserted into the container, that the scanning element is rigidly mounted on the support outside the cassette container which is in its loading position and opposite said further narrow side of a cassette inserted in the cassette container, and that control elements for moving the cassette-container control elements are activated when the support is moved, which elements guide the cassette container towards the scanning element before said container reaches the operating position, said scanning element passing through an opening in the cassette container into the opening of a cassette contained in the cassette container. Thus, cooperation of the scanning element with the record carrier, which is accommodated in a cassette which has been inserted in the cassette container, is already achieved when the cassette container is moved from the loading position to the operating position, so that said operation has already been completed when the cassette container, and thus the cassette contained therein together with the scanning element, reaches the operating position, thus always ensuring positive cooperation between the scanning element and the record carrier.

In a preferred embodiment of the invention the support comprises a plate-shaped guide portion, on which parallel to the plane of the plate the cassette container is movably disposed with one of its two walls which are perpendicular to the two narrow sides of a cassette to be inserted into the cassette container, at least a part of the guide portion directly adjoining a cassette inserted into the cassette container. Thus, the guide member provides guidance both for the cassette container and for a cassette inserted or to be inserted therein, so that both insertion of a cassette into the cassette container as well as the movement of the two from the loading position to the operating position is effected in a particularly reliable manner. In this respect it is preferred when the support comprises at least a further guide portion which, when the cassette container is in the loading position, is in line with a wall of the cassette container which directly adjoins a cassette inserted into the cassette container. Such a further guide portion thus provides additional guidance for a cassette when it is moved from the feed-in position into the cassette container which is in the loading position, so that this operation is performed in a particularly reliable manner.

Suitably, the track of the control elements for guiding the cassette container towards the scanning element is disposed on an arm which is pivotable in the direction of movement of the cassette container, which container is loaded by a spring which acts in this direction of movement towards the scanning element, and at least one positioning means for the cassette is provided on the support near the scanning element, which means cooperates with a cassette which is contained in the cassette container which is moved towards the scanning element. Thus, it is not the control elements but the positioning means which determines the ultimate position of the cassette and thus that of the record carrier relative to the scanning element, so that the movement of the cassette container from the loading position to the operating position is no longer critical. In this respect it is to be noted that such positioning means in equipment, in which the cassette is manually brought into the operating position, are known per se.

The invention will be described in more detail with reference to the drawing, which shows an embodiment of the invention, the scope of the invention being by no means limited to said embodiment.

Figure 2:
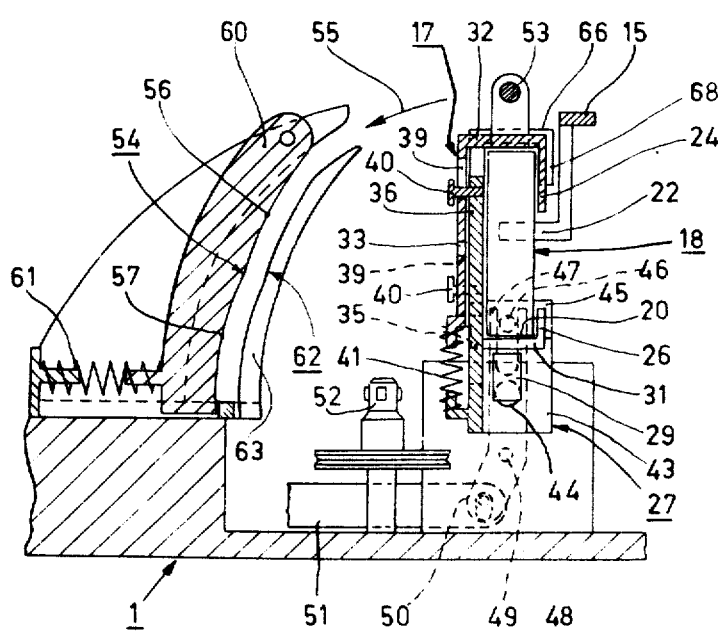
Figure 3:
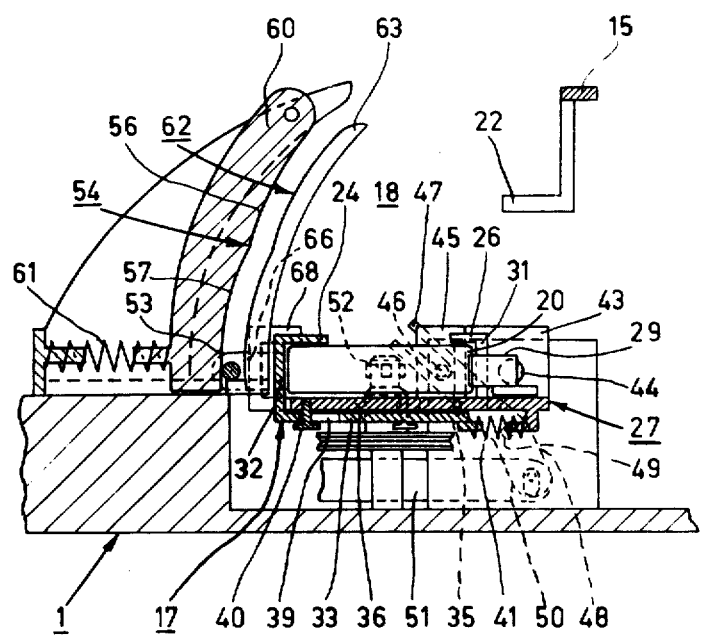

FIG. 1 shows a side view, part sectional view, of the apparatus, the cassette container with inserted cassette being in the loading position, FIG. 2 shows a section in accordance with the line II—II in FIG. 1, and FIG. 3 shows the same section as in FIG. 2, but with the cassette container now in its operating position.

In the Figures the reference numeral 1 refers to a basic apparatus, which has a channel 2 for insertion of a magazine 3. The magazine has adjacent separate compartments, into each of which a cassette which accommodates a record carrier in the form of a tape can be inserted. The bottom section 4 of the magazine has a cut-out 5, through which the cassettes inserted in the compartments are accessible. Furthermore, the bottom section 4 is provided with teeth 6, which cooperates with a gear wheel 7 which is disposed on the basic apparatus, which gear wheel can be driven by a motor 8, so that the magazine can be moved in the channel 2. At the bottom surface 9 of the channel 2, a ramp 10 is provided at a spcifical location, which corresponds to the cut-out 5 in the magazine and which projects therein, so that said ramp 10 cooperates with the cassettes contained in the magazine at said location and lifts these cassettes into the magazine. Such a lifted position of a cassette is schematically represented in FIG. 1 by dash-dot lines 11, while the position of a cassette which is not in contact with the ramp 10 is represented by dash-dot lines 12. In the side wall 13 of the magazine a slot 14 is formed in each compartment, at whose level a cassette 11 which has been lifted by the ramp 10 is situated so that in this position said cassette can be removed sideways from the magazine. This lifted position of a cassette is the feed-in position, in which the cassette can be removed from the magazine and can be transferred to the basic apparatus with a slide 15, schematically shown in FIG. 1 by dash-dot lines, which surrounds the cassette in this position and which takes the form of a gripper when said slide is moved in the direction of the arrow 16.

The basic apparatus comprises a cassette container 17, which can be moved between a loading position and an operating position. In the loading position the cassette container is disposed with its opening opposite the slot 14 of that compartment of the cassette magazine which is situated near the ramp 10 in the feed-in position for a cassette, so that a cassette contained in said compartment can be slid into the cassette container 17 with one of the narrow sides first in the direction of the arrow 16. Such a cassette which has been slid into the cassette container 17 is designated 18, the narrow side with which the cassette is inserted having the reference numeral 19. The further narrow side 20, which adjoins said narrow side 19 and which extends in the direction of insertion, has an opening 21 behind which the record carrier, not shown, which is accommodated in the cassette, extends. In order to ensure the movement of the slide 15 from its position above the cassette magazine towards the cassette container, said slide only extends in the path of movement of such a cassette with two angular ends 22 and 23, also see FIG. 2, which grip the relevant cassette, and the cassette container 17, for a free movement along said path, does not fully surround a cassette inserted in it, for which purpose that wall along which the slide 15 is moved is not a continuous solid wall, and only consists of a wall portion 24 and two wall portions 25 and 26 opposite thereto at a distance, so that a free path for the end 22 of the slide is obtained.

For moving the cassette container from its loading position to the operating position a support 27 for the cassette container 17 is provided, on which support said container is arranged to be movable in a direction perpendicular to the further narrow side 20 of the cassette 18 contained in it. Furthermore, two magentic heads 28 and 29, which each serve as a scanning element for the record carrier, are mounted on the support 27 outside the cassette-container which is in its loading position and opposite the opening 21 in the further narrow side 20 of the cassette 18 which is inserted in the cassette container; the magnetic head 28 is for example an erase head and the magnetic head 29 a recording / playback head. The magnetic heads 28 and 29 are then disposed directly in front of the opening 21, because the wall of the cassette container 17, which adjoins the narrow side 20 of the cassette 18, only consists of two wall postions 30 and 31 which adjoin the wall portions 25 and 26, so that between the wall portions 30 and 31 an opening is formed in the cassette container. The cassette container 17 is complete by a wall portion 32, which adjoins the wall portion 24, and a wall portion 33 which adjoins the wall portion 32, which with the bent wall portions 34 and 35 provided on it constitutes the connection with the wall portions 30 and 31, so that the cassette container in its totality is fomred by the portions 24–32–33,34 and 35–30 and 31–25 and 26, the two last mentioned portions and the first-mentioned portion belonging to one wall.

The support 27 has a planar, or plate-shaped guide portion 36 on which the cassette container 17 is movably disposed. The guide portion 36 partly directly adjoins the cassette 18 which is inserted in the cassette container; and the wall 33 of the container 17 is parallel to the side of the plate-shaped guide portion 36 which faces away from the cassette 18, with the bent wall portions 34 and 35 directly adjacent to the cassette 18, the wall portions 34 and 35 each projecting into a recess 37 and 38 respectively formed in the guide portion 36. In the wall 33 slots 39 are formed which extend in the direction of movement of the cassette container, through which slots bolts 40 project by means of which the cassette container is secured to the guide portion 36. Between the cassette container and the guide portion a spring 41 is provided, which tends to keep the cassette container away from the magnetic heads 28 and 29, which are also mounted on the plate-shaped guide portion, so that said heads are located outside the cassette container when it is in the loading position. As can be seen from the above, the wall portions 34 and 35, which are bent with respect to the wall 33, and the guide portion 36 form wall portions which alternately adjoin the cassette 18, so that a common guide surface for the cassette is obtained when the cassette container with the cassette is moved parallel to the guide portion.

The support 27 is pivoted to the basic apparatus. For this purpose, the guide portion 36 comprises two perpendicularly bent tabs 42 and 43 each with a journal 44, which are rotatably journalled to the basic apparatus. Furthermore the tab 43 is provided with a bent projection 45, which comprises a pin 46 which extends into the fork 47 of a lever 48, which is pivotable about a pivot 49 on the basic apparatus. An actuating lever 51 for pivoting the support is connected to the end 50 of the lever 48 which is remote from the fork 47. In the loading position of the cassette container the axes of the pin 46, the journal 44 and the pivot 49 are disposed in line, so that a lever transmission is obtained, which for a relatively small travel of the actuating lever 51 causes a comparatively large travel of the support. In the present case the support can be pivoted through 90°relative to the loading position of the cassette container, after which the cassette container occupies the operating position as shown in FIG. 3. In this operating position the drive means cooperate with the record carrier accomodated in the cassette 18 for advancing said carrier, which means comprise drivable winding spindles 52, which can be made to engage with winding hubs, not shown, which are rotatable in the cassette, between which the record carrier extends.

For moving the cassette container 17 on the support 27 control elements are provided which are activated when the support is pivoted. The control elements move the cassette container towards the magnetic heads 28 and 29 before its operating position is reached, said heads being passed into the opening 21 of the cassette contained in the cassette container via the opening formed by the wall portions 30 and 31 of the cassette container. Said control elements consist of a roller 53 disposed on the cassette container 17 and a curved track 54 in the apparatus. When the support is pivoted so as to move the cassette container from its loading position to its operating position in the direction of the arrow 55 the roller 53 first comes into contact with a part 56 of the curved track 54, which ensures that the cassette container is moved in the direction of the magnetic heads 28 and 29, after which the roller is guided along a second part 57 of the curved track 54, which no longer results in a movement of the cassette container. Thus, the cassette container is already positioned against the magentic heads, before the container has reached its operating position.

In order to ensure a particularly accurate position of the cassette 18 and thus of the record carrier accommodated in it relative to the magnetic heads, positioning means 58 are provided on the support 27 near the heads 28 and 29, which are formed by projections and which comprise reference faces. When the cassette 18 contained in the cassette container is correctly positioned against the magentic heads, said positioning means directly cooperate with corresponding openings 59 formed in the narrow side 20 of the cassette 18, passing through the corresponding openings in the cassette container, so that the position of the cassette is exactly defined. In order to enable the control elements to adapt themselves to said position, the curved track 54 is disposed on an arm 60 which is pivotable in the direction of movement of the cassette container, which arm is loaded by a spring 61, which tends to move the arm in the direction of movement of the cassette container. Thus, the cassette which is contained in the cassette container is always positioned against the positioning means also in the operating position of the cassette container and possible tolerances of the control elements will no longer affect the position of the cassette.

Parallel to the curved track 54 at a distance therefrom which corresponds to the diameter of the roller 53 a further curved track 62 extends, which is formed on a fixed part 63 of the apparatus. Said curve track 62 is active when the cassette container with the carrier is returned from the operating position to the loading position. Thus, the action of the spring 41 is automatically sustained, so that is is ensured that the cassette container reaches the loading position, after which removal of the cassette 18 from and returning into the magazine 3 can proceed without any difficulties.

As appears from the above, when the cassette container is moved from the loading position to the operating position, the cassette contained therein is positioned against the magnetic heads before the operating position of the cassette container is reached, said operation being already completed before the operating position is reached. Thus, an accurately defined position of the magnetic heads relative to the cassette and the record carrier accommodated therein is obtained, which is essential for a correct operation of the apparatus. The movements required for this are simple and provide great reliability, which is of special importance when the cassettes are to be changed frequently, as is for example the case when such an apparatus is employed as a central dictation system.

In order to ensure a definite transfer of the cassette from the feed-in position in the magazine 3 to the cassette container 17, which is in the loading position, the support 27 is provided with further guide portions, which when the cassette container is in the loading position, are in line with a wall of the cassette container which directly adjoins a cassette which has been inserted into the cassette container. In the preferred embodiment shown, these further portions include a second guide portion 64 which is offset from the tab 42, which is in line with the wall portions 30 and 31 of the cassette container in its loading position, and third guide portions 65, 66 and 67, 68, which in their turn are in line with the wall portions 32 and 34 respectively of the cassette container, and parallel to the guide portion 36. Thus, an insertion channel is formed in the loading position of the cassette container, which provides positive guidance for the cassette.

It is obvious that within the scope of the invention there are several modifications to the embodiments described hereinbefore. This applies in particular to the method in which the cassette container is movably disposed on the support, and the cooperation of the guide surfaces of the support and the walls of the cassette container during insertion of a cassette into the cassette container or the movement of said container on the support; for example, the wall 33 as a whole may be disposed at the side of the guide portion 36 of the support which is remote from the cassette 18, so that in this area only said guide portion directly adjoins the cassette, or the cassette container may only directly adjoin the cassette, the cassette container as such being movably disposed on the support. Furthermore, the control elements may, for example, be designed so that the curved tracks guide the roller on the cassette container also in its loading position. Obviously, it is also possible that the cassette container is not moved from its loading position to the operating position by a pivoting movement of the support, but that this is effected by a sliding movement of the support, however, the movement of the cassette container towards the scanning element again being performed before the operating position is reached.

What is claimed is:
1. A cassette recording apparatus for cassettes having a first side and a second side perpendicular to the first side, the second side having a location for operative scanning for a record carrier in the cassette by a scanning element, comprising a cassette container; means for moving the cassette container from a loading to an operating position; and means for feeding a cassette with said first side first from a feed-in position in the apparatus into the container when the container is in a loading position;
wherein said moving means comprises a container support,
a scanning element rigidly mounted on the support outside said container when the container is in said loading position; and when a cassette is in the container, said element being opposite a second side of the cassette,
means for moving the support from a loading to an operating position, and
control element means for moving said container with respect to said support responsive to movement of said support from said loading position toward said operating position, such that when a cassette is in the container said second side will be brought into operative engagement with the scanning element before the container reaches the operating position.

2. An apparatus as claimed in claim 1 wherein said support comprises a planar guide portion, the cassette container being movably disposed parallel to the plane of the plate, at least a part of the guide portion directly adjoining a cassette inserted in the cassette container.

3. An apparatus as claimed in claim 2 wherein said guide portion is perpendicular to said first and second sides of a cassette in the container.

4. An apparatus as claimed in claim 1, wherein said cassette container has a wall arranged to directly adjoin a cassette inserted in the container, and said support comprises at least one further guide portion so arranged that, when the cassette container is in the loading position, said further guide portion is in line with said container wall.

5. An apparatus as claimed in claim 4 wherein said further guide portion is a second guide portion perpendicular to said planar guide portion.

6. An apparatus as claimed in claim 4 wherein said further guide portion is a third guide portion parallel to said planar guide portion.

7. An apparatus as claimed in claim 1 wherein said control element means comprises an arm and means for mounting the arm for pivotal movement about an axis parallel to said planar portion and transverse to a direction of movement of said container toward said operating position, and means for biasing said arm toward the scanning element; and wherein said support comprises at least one positioning means for positioning a cassette which has been set into the container and moved toward the scanning element.

* * * * *